(12) United States Patent
Yarosh et al.

(10) Patent No.: US 11,669,191 B2
(45) Date of Patent: Jun. 6, 2023

(54) DETECTING THE ANGLE OF A TOUCH SCREEN MOUNTED PASSIVE DIAL

(71) Applicant: Cypress Semiconductor Corporation, San Jose, CA (US)

(72) Inventors: Andriy Yarosh, Lviv (UA); Jens Weber, Munich (DE)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/463,940

(22) Filed: Sep. 1, 2021

(65) Prior Publication Data

US 2022/0164057 A1 May 26, 2022

Related U.S. Application Data

(63) Continuation of application No. 16/826,723, filed on Mar. 23, 2020, now Pat. No. 11,119,602.

(60) Provisional application No. 62/885,029, filed on Aug. 9, 2019.

(51) Int. Cl.
*G06F 3/041* (2006.01)
*G06F 3/0362* (2013.01)
*G06F 3/044* (2006.01)

(52) U.S. Cl.
CPC .......... *G06F 3/0416* (2013.01); *G06F 3/0362* (2013.01); *G06F 3/0445* (2019.05); *G06F 3/0446* (2019.05)

(58) Field of Classification Search
None
See application file for complete search history.

(56) References Cited

U.S. PATENT DOCUMENTS 11,119,602 B2 * 9/2021 Yarosh .................. G06F 3/0393

* cited by examiner

*Primary Examiner* — Ifedayo B Iluyomade

(57) ABSTRACT

A touch screen display and corresponding devices and methods are disclosed, the touch screen display comprising a touchscreen having a plurality of capacitive sensors and a passive dial having one or more conductive elements, the passive dial mounted within an active area of the touchscreen such that the one or more conductive elements are proximate to the face of the touchscreen and move in conjunction with a rotation of the passive dial. The touch screen display may further include a touchscreen controller to detect an angle of the passive dial using conventional capacitive sensing techniques.

12 Claims, 19 Drawing Sheets

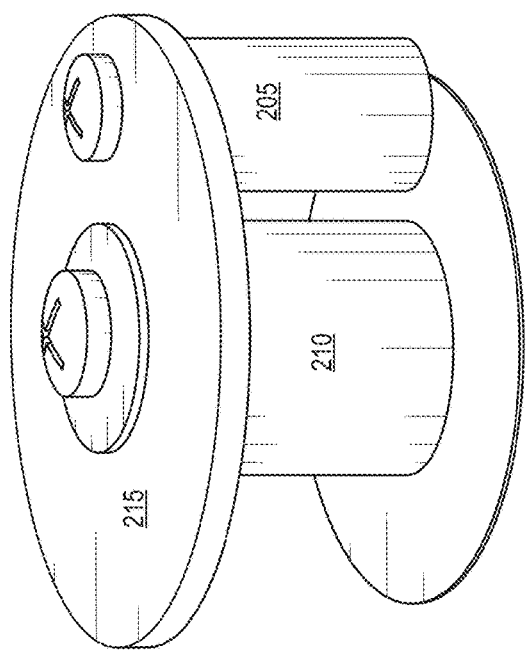
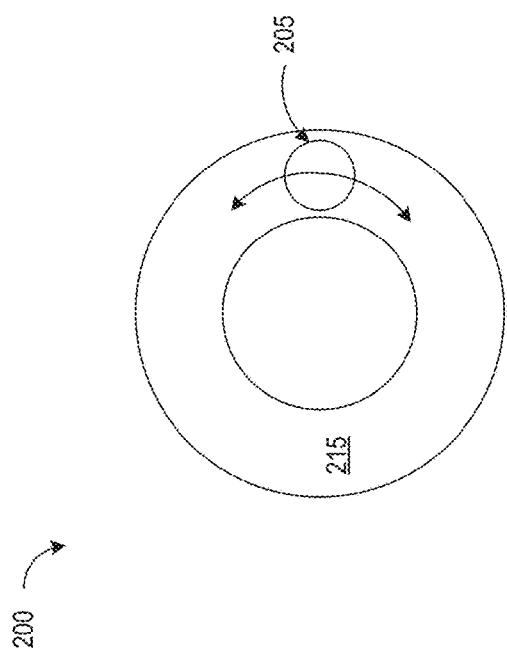
FIG. 2B
FIG. 2A

DETECTING THE ANGLE OF A TOUCH SCREEN MOUNTED PASSIVE DIAL

RELATED APPLICATIONS

This application is a Continuation of U.S. patent application Ser. No. 16/826,723, filed on Mar. 23, 2020, which claims priority to U.S. Provisional Patent Application No. 62/885,029, filed on Aug. 9, 2019, both of which are hereby incorporated herein by reference in their entirety.

TECHNICAL FIELD

The present disclosure relates generally to sensing systems, and more particularly to capacitance measurement systems configurable to determine the angle or position of a passive device on a touch screen display.

BACKGROUND

A touch screen display typically includes a touch screen that uses capacitive, resistive, inductive, optical, acoustic or other technology to determine the presence, location and or motion of one or more fingers, styli, and/or other objects. For example, capacitive sense arrays function by measuring the capacitance of a capacitive sense element and evaluating for a delta in capacitance indicating a touch or presence of a conductive object. When a conductive object (e.g., a finger, hand, or other object) comes into contact or close proximity with a capacitive sense element, the capacitance changes and the conductive object is detected. Capacitance sensing systems can sense electrical signals generated on electrodes that reflect changes in capacitance. Such changes in capacitance can indicate a touch event (i.e., the proximity of an object to particular electrodes). The capacitance changes can be measured by an electrical circuit that converts the signals corresponding to measured capacitances of the capacitive sense elements into digital values. The measured capacitances are generally received as currents or voltages that are integrated and converted to the digital values.

There are two typical types of capacitance: 1) mutual capacitance where the capacitance-sensing circuit measures a capacitance formed between two electrodes coupled to the capacitance-sensing circuit; 2) self-capacitance where the capacitance-sensing circuit measure a capacitance of one electrode. A touch panel has a distributed load of capacitance of both types (1) and (2) and some touch solutions sense both capacitances either uniquely or in hybrid form with its various sense modes.

Capacitive sense elements may be used to replace mechanical buttons, dials/knobs, and other similar mechanical user interface controls. The use of such sense elements may replace the functionality of complicated mechanical switches and buttons, while providing reliable operation under harsh conditions. In addition, these sense elements are widely used in modern customer applications to provide user interface options in existing products. These sense elements can range from a single button to a large number arranged in the form of a capacitive sense array for a touch-sensing surface.

Sense arrays and touch buttons are ubiquitous in today's industrial and consumer markets. They can be found on cellular phones, GPS devices, set-top boxes, cameras, computer screens, MP3 players, digital tablets, and the like.

BRIEF DESCRIPTION OF THE DRAWINGS

The present embodiments are illustrated by way of example, and not of limitation, in the figures of the accompanying drawings.

FIGS. 2A and 2B illustrate a passive dial, according to some embodiments of the present disclosure.

DETAILED DESCRIPTION

Figure 1A:
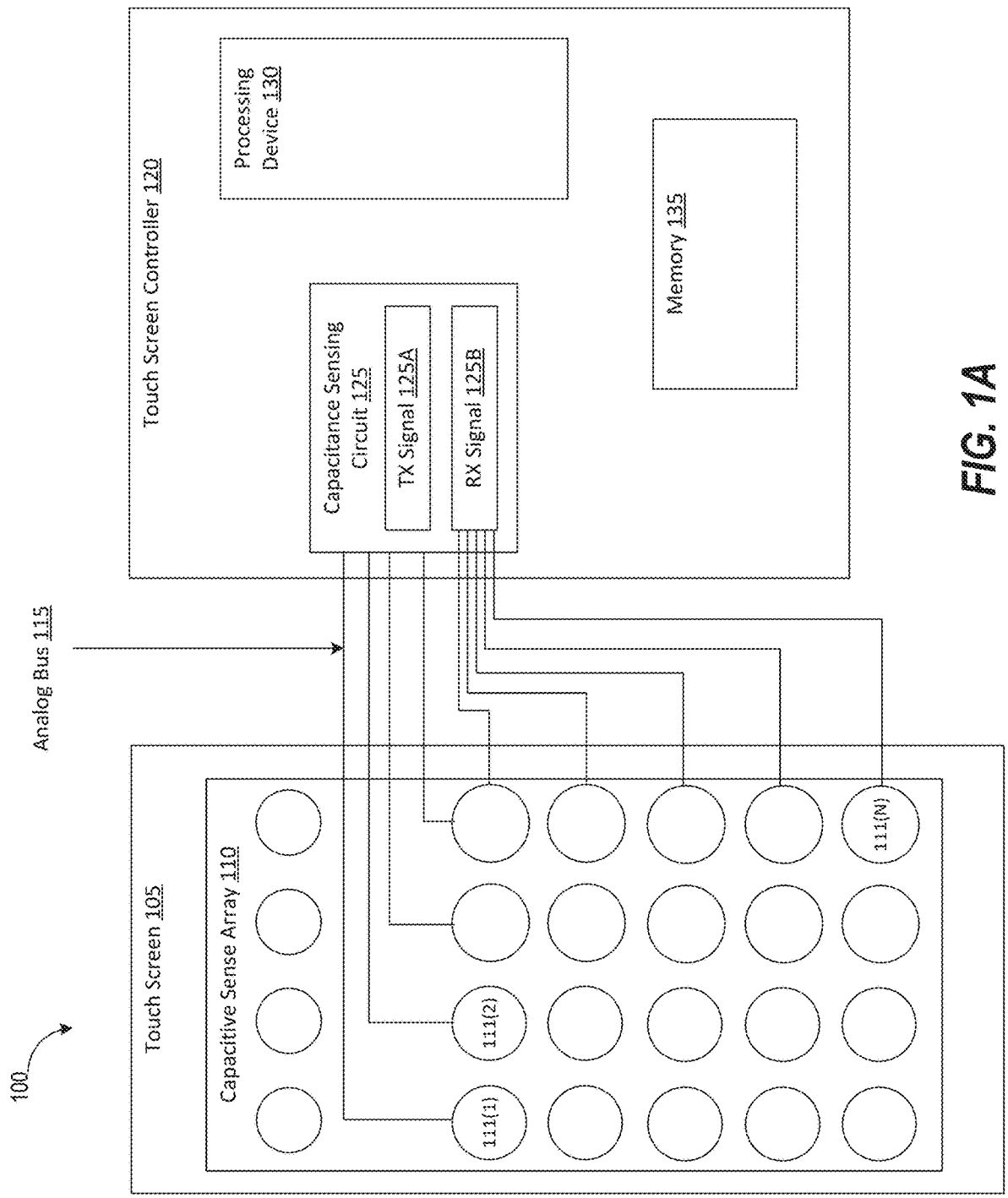
FIG. 1A is a block diagram illustrating a capacitive touchscreen display, according to some embodiments of the present disclosure.

In the following description, for purposes of explanation, numerous specific details are set forth in order to provide a thorough understanding of the present embodiments. It will be evident, however, to one skilled in the art that the present embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

Capacitive sense arrays and touch buttons are ubiquitous in today's industrial and consumer markets. Capacitive sense elements may be used to replace the functionality of mechanical buttons, dials/knobs, and other similar mechanical user interface controls. Despite this, dials remain a popular option among users in many applications, for example in cars due to their native haptic and human habit preferences. However, the expanding size of touch screens in vehicles and other applications often reduces the space available for dials. In addition, because touch screens can replace the functionality of dials, a separate dial may be redundant.

The embodiments described herein are directed at detecting the angle of a passive dial mounted on a touch screen display, using conventional capacitive sensing techniques. The dial may be a passive device, and thus may not include electronics of any kind (e.g., on-board measurement system) or be powered in any way. The dial may include a conductive element which may be mounted on the dial such that the conductive element is in close proximity to the touch screen. In this way, the conductive element may have electrical or capacitance coupling with the touch screen such that its angle can be detected. As the dial is rotated, the conductive element may rotate, and thus the rotation and current angle of the conductive element (and thus the dial) may be detected by the capacitive sense array. Embodiments described herein also include detecting and removing parasitic negative response resulting from initial movement of the dial. The embodiments described herein may be resistant to noise, owing to the passive nature of the dial, and may not be sensitive to capacitance measurement drifts due to temperature, as described in further detail herein. In addition, because the angle position is calculated directly (i.e. angle position is the primary variable), there is no radius jitter. Other advantages may be achieved alternatively or in addition to the advantages described herein.

Described herein are devices, methods, and systems that determine the position of a passive dial mounted on a touch screen display, using conventional capacitive sensing techniques. In one embodiment, a touch screen display is disclosed, the touch screen display comprising: a touchscreen having a plurality of capacitive sensors and a passive dial having one or more conductive elements. The passive dial may be mounted within an active area of the touchscreen such that the one or more conductive elements are proximate to the face of the touchscreen and move in conjunction with a rotation of the passive dial. The touch screen display may further comprise a touchscreen controller operatively coupled to the touchscreen. The touchscreen controller may detect an angle of the passive dial based at least in part on a capacitive response of each of a set of the plurality of capacitive sensors to the one or more conductive elements as the passive dial rotates and output data corresponding to the angle of the passive dial to a user interface controller.

Although described with respect to capacitive sensing systems, the embodiments of the present disclosure may be realized in a touch screen display utilizing any appropriate sensing system (e.g., inductive, resistive).

For example, inductive sensing systems may include one or more sensing elements that pick up loop currents induced by a resonating coil or pair of coils. Some combination of the magnitude, phase, and frequency of the currents may then be used to determine positional information.

In another example, resistive sensing systems may include a flexible and conductive first layer that is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

FIG. 1A is a block diagram illustrating one embodiment of a touch screen display 100. The touch screen display 100 may comprise a touch screen 105, a user interface controller 140, and a touch screen controller 120. The touch screen 105 may include a capacitive sense array 110, and the touch screen controller 120 may be configured to measure capacitances (self or mutual capacitances) from the capacitive-sense array 110. In one embodiment, a multiplexer circuit may be used to connect a capacitive-sensing circuit 125 of the touch screen controller 120 with the sense array 110 in various configurations. The touch screen 105 (e.g., a touchscreen, or a touch pad) may be coupled to the touch screen controller 120, which may be coupled to a host computing device (not shown). In one embodiment the sense array 110 is a two-dimensional sense array that uses touch screen controller 120 to detect touches on the touches screen 105.

In one embodiment, the sense array 110 includes electrodes 111(1)-111($n$) (where N is a positive integer) that are disposed as a two-dimensional matrix (also referred to as an XY matrix). The sense array 110 is coupled to the touch screen controller 120 via one or more analog buses 115 transporting multiple signals. In a further embodiment, a multiplexer (not illustrated) can be used to couple the capacitance-sensing circuit 125 in various configurations as described herein. The capacitive sense array 110 may include a multi-dimension capacitive sense array. The multi-dimension sense array includes multiple sense elements, organized as rows and columns. In another embodiment, the capacitive sense array 110 operates as an all-points-addressable ("APA") mutual capacitive sense array. In yet other embodiments, the capacitive sense array 110 is non-transparent capacitive sense array (e.g., PC touchpad). The capacitive sense array 110 may be disposed to have a flat surface profile. Alternatively, the capacitive sense array 110 may have non-flat surface profiles. Alternatively, other configurations of capacitive sense arrays may be used. For example, instead of vertical columns and horizontal rows, the capacitive sense array 110 may have a hexagon arrangement, or the like, as would be appreciated by one of ordinary skill in the art having the benefit of this disclosure. In one embodiment, the capacitive sense array 110 may be included in a panel or a touch screen panel made from e.g., Indium tin oxide (ITO) or any other transparent conductor.

In one embodiment, the capacitance-sensing circuit 125 may include one or more receive (RX) channels to measure charge on the electrodes 111. There are various methods of measuring capacitance on the capacitive-sense array 110, such as self-capacitance sensing and mutual capacitance sensing. The RX channels may include a relaxation oscillator or other means to measure capacitance and a counter or timer to measure the oscillator output. In another embodiment, the RX channels include an operational amplifier, a switch, and an integrator capacitor, as described and illustrated with respect to FIG. 2. The RX channels measure the signals representing the self-capacitance of the electrodes 111(1)-111($n$). The capacitance-sensing circuit 125 also includes a converter circuit, such an analog-to-digital converter (ADC) that converts the measured signals into digital values. The touch screen controller 120 may further include software components to convert the count value (e.g., capacitance value) into a touch detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, in some embodiments, instead of evaluating the raw counts relative to a threshold, the capacitance-sensing circuit 125 may be evaluating other measurements to determine the user interaction. For example, in the capacitance-sensing circuit 125 having a sigma-delta modulator, the capacitance-sensing circuit 125 is evaluating the ratio of pulse widths of the output (i.e., density domain), instead of the raw counts being over or under a certain threshold. It should be noted that the RX channels may be one type of sensing channel that can be configured for different operational modes. For example, the RX channels in a self-capacitance mode are configured as sensing channels for driving and sensing an electrode to measure a self-capacitance of the electrode relative to ground. The RX channels can also be configured to be sensing channels for a mutual capacitance mode in which a mutual capacitance between a first electrode (RX) and a second electrode (TX) is measured. The TX electrode in this mode is driven by a TX signal, as described herein. Alternatively, the RX channels can be configured for a self-capacitance and mutual capacitance mode in which self-capacitance and mutual capacitance can be measured concurrently or sequentially.

In another embodiment, the capacitance-sensing circuit 125 includes a TX signal generator to generate a Tx signal 125A to be applied to the TX electrode and a receiver (also referred to as a sensing channel), such as an integrator, coupled to measure an RX signal 125B on the RX electrode. In a further embodiment, the capacitance-sensing circuit includes an analog-to-digital converter (ADC) coupled to an output of the receiver to convert the measured RX signal to a digital value representative of a capacitance value. The digital value can be further processed by the touch screen controller 120.

The touch screen controller 120 is configured to detect one or more conductive objects in contact with or in proximity with the touch screen 105. As used herein, a "touch" may refer to a conductive object in contact with or in proximity to the touch screen 105. The touch screen controller 120 can detect conductive objects, such as fingers or passive styluses, an active stylus, or any combination thereof. The capacitance-sensing circuit 125 can measure touch data on the capacitive sense array 110. The touch data may be represented as multiple cells, each cell representing an intersection of sense elements (e.g., electrodes) of the capacitive sense array 110. An intersection between two sense elements may be understood as a location at which one sense electrode crosses over or overlaps another, while maintaining galvanic isolation from each other.

The capacitive sense elements 111 are electrodes of conductive material, such as copper. The sense elements 111 may also be part of a panel made from ITO or any other transparent or semi-transparent conductive material. The capacitive sense elements 111 can be configurable to allow the capacitive-sensing circuit 125 to measure self-capacitance, mutual capacitance, or any combination thereof. In another embodiment, the touch data is a 2D capacitive image of the capacitive sense array 110. In one embodiment, when the capacitance-sensing circuit 125 measures mutual capacitance of the touch-sensing device (e.g., capacitive sense array 110), the capacitance-sensing circuit 125 obtains a 2D capacitive image of the touch-sensing device and processes the data for peaks and positional information. In another embodiment, the touch screen controller 120 is a microcontroller that obtains a capacitance touch signal data set, such as from the sense array 110, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a correlation algorithm, which calculates a correlation coefficient of each possible angle, and identifies the angle having the highest correlation coefficient as the position of the touch. The X/Y coordinates of the peak may describe the exact position of the touch, as described in further detail herein. Alternatively, other coordinate interpolation algorithms may be used to determine the coordinates of the resulting peaks. The touch screen controller 120 can report the precise coordinates to a host 150 (e.g., host processor), as well as other information.

In one embodiment, the touch screen controller 120 further includes processing device 130. Operations of the processing device 130 may be implemented in firmware; alternatively, they may be implemented in hardware or software. The processing device 130 may receive signals from the capacitance-sensing circuit 125, and determine the state of the sense array 110, such as whether an object (e.g., a finger) is detected on or in proximity to the sense array 110 (e.g., determining the presence of the object), resolve where the object is on the sense array (e.g., determining the location of the object), tracking the motion of the object, or other information related to an object detected at the touch sensor.

In another embodiment, instead of performing the operations of the processing device 130 in the touch screen controller 120, the touch screen controller 120 may send the raw data or partially-processed data to the host 150. The host 150, as illustrated in FIG. 1, may include decision logic 151 that performs some or all of the operations of the processing device 130. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing device 130 may be implemented in the decision logic 151, the applications 152, or in other hardware, software, and/or firmware external to the touch screen controller 120. In some other embodiments, the touch screen controller 120 is or includes the host 150.

In another embodiment, the touch screen controller 120 may also include a non-sensing actions block 103. This block 103 may be used to process and/or receive/transmit data to and from the host 150. For example, additional components may be implemented to operate with the touch screen controller 120 along with the sense array 110 (e.g., keyboard, keypad, mouse, trackball, LEDs, displays, or other peripheral devices).

As illustrated, capacitance-sensing circuit 125 may be integrated into touch screen controller 120. Capacitance-sensing circuit 125 may include analog I/O for coupling to an external component, such as touch-sensor pad (not shown), capacitive sense array 110, touch-sensor slider (not shown), touch-sensor buttons (not shown), and/or other devices. The capacitance-sensing circuit 125 may be configurable to measure capacitance using mutual-capacitance sensing techniques, self-capacitance sensing technique, charge coupling techniques, or the like. In one embodiment, capacitance-sensing circuit 125 operates using a charge accumulation circuit, a capacitance modulation circuit, or other capacitance sensing methods known by those skilled in the art. In an embodiment, the capacitance-sensing circuit 125 is of the Cypress TMA-4xx, or TMA-xx families of touch screen controllers. Alternatively, other capacitance-sensing circuits may be used. The capacitive sense arrays, or touch screens, as described herein, may include a transparent, conductive sense array disposed on, in, or under either a visual display itself (e.g. LCD monitor), or a transparent substrate in front of the display.

In an embodiment, the TX and RX electrodes are configured in rows and columns, respectively. It should be noted that the rows and columns of electrodes can be configured by the touch screen controller 120 (or capacitance-sensing circuit 125) as individual electrodes for self-capacitance measurements, as TX or RX electrodes for mutual capacitance measurements, in any combination. Similarly, the touch screen controller 120 (or capacitance-sensing circuit 125), such as via a multiplexer, can configure the electrodes as RX electrodes for self-capacitance sensing, and one or more electrodes as barrier electrodes. In a further embodiment, the touch screen controller 120 (or capacitance-sensing circuit 125) can also configure some electrodes to be driven by a shield signal. An intersection between two sense elements may be understood as a location at which one sense electrode crosses over or overlaps another, while maintaining galvanic isolation from each other. When a touch object, such as a finger or stylus, approaches the capacitive sense array 110, the object causes a decrease in mutual capacitance between some of the TX/RX electrodes. In another embodiment, the presence of a finger increases the coupling capacitance of the electrodes. Thus, the location of the finger on the capacitive sense array 110 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by touch screen controller 120 may also be done in the host.

The touch screen controller 120 may reside on a common carrier substrate such as, for example, an integrated circuit (IC) die substrate, or a multi-chip module substrate. Alternatively, the components of the touch screen controller 120 may be one or more separate integrated circuits and/or discrete components. In one embodiment, the touch screen controller 120 may be the Programmable System on a Chip (PSoC®) processing device, developed by Cypress Semiconductor Corporation, San Jose, Calif. Alternatively, the touch screen controller 120 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the touch screen controller 120 may be a network processor having multiple processors including a core unit and multiple micro-engines. Additionally, the touch screen controller 120 may include any combination of general-purpose processing device(s) and special-purpose processing device(s).

Capacitance-sensing circuit 125 may be integrated into the IC of the touch screen controller 120, or alternatively, in a separate IC. Alternatively, descriptions of capacitance-sensing circuit 125 may be generated and compiled for incorporation into other integrated circuits. For example, behavioral level code describing the capacitance-sensing circuit 125, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 125.

It should be noted that the components of touch screen display 100 may include all the components described above. Alternatively, touch screen display 100 may include some of the components described above.

In one embodiment, the touch screen display 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Figure 1B:
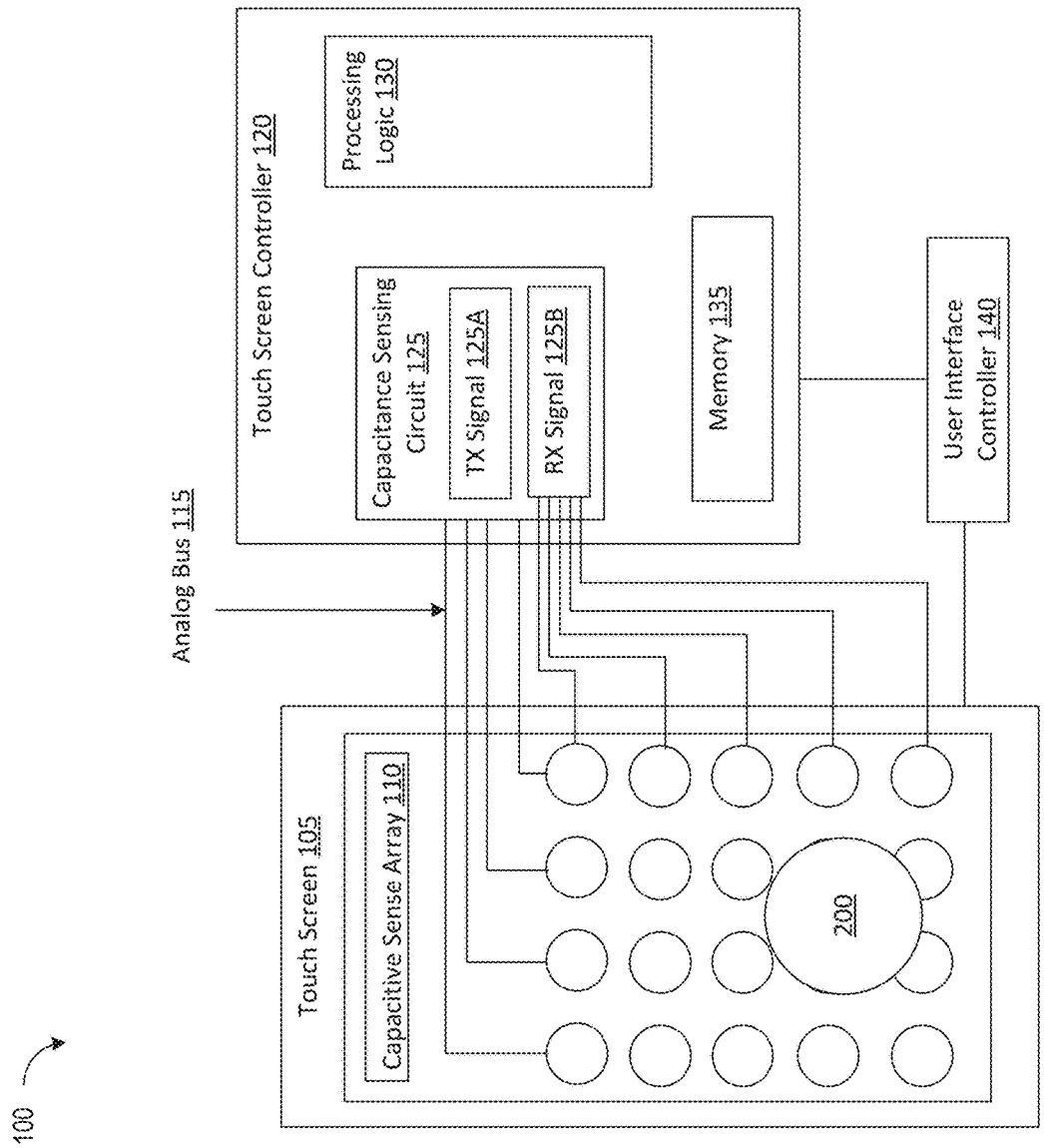
FIG. 1B is a block diagram illustrating a capacitive touchscreen display having a passive dial mounted thereon, according to some embodiments of the present disclosure.

FIG. 1B illustrates the touch screen display 100 of FIG. 1A, with a dial 200 mounted on the touch screen 105. The dial 200 may be any appropriate rotary mechanism (e.g., a knob) and may be mounted on an active area (e.g., where the capacitive sensors 111 are located) of the touch screen 105. Although illustrated as mounted entirely on the active area of the touch screen 105, in some embodiments, the passive dial 200 may be mounted partially on the active area of the touch screen 105, with part of the passive dial 200 overlapping an area that is not within the active area of the touch screen 105. The dial 200 may be mounted in any appropriate manner. In some embodiments, the dial 200 may include an acrylic panel that is glued to the surface of touch screen 105.

The dial 200 may be a passive device, and thus may not include electronics of any kind (e.g., on-board measurement system) or be powered in any way. FIGS. 2A and 2B illustrate bottom and side views of the dial 200 of FIG. 1B. The dial 200 may include a conductive element 205 (shown in FIGS. 2A and 2B and also referred to herein as a "finger simulator"), which may be mounted on the dial 200 such that the conductive element 205 is in close proximity (e.g., 0.1-0.5 millimeters) to the touch screen 105. In this way, the conductive element 205 may have electrical or capacitance coupling with the touch screen 105 such that the angle of the dial 200 can be detected. As the dial 200 is rotated, the conductive element 205 may rotate, and thus the rotation and current angle of the conductive element 205 (and thus the dial 200) may be detected by the capacitive sense array 110 as discussed herein. For example, the touch screen controller 120 may obtain from the capacitive sense array 110, a capacitance touch signal data set resulting from rotation of the conductive element 205 through every angle (1-360), and position detection firmware executing on the touch screen controller 120 identifies data set areas that indicate an angle of the conductive element 205 based on the peaks in the data set as discussed further herein. For example, the firmware can calculate the precise angle of the conductive element 205 using a correlation algorithm and display the angle on the touch screen 105 in any appropriate manner. As used herein, the angle of the dial or conductive element may refer to the current angle of the dial or conductive element.

The conductive element 205 may be made of any appropriate metal, and although illustrated as a cylinder in FIGS. 2A and 2B, the conductive element 205 may have any appropriate shape (e.g., rectangular cube). The dial 200 may include a rotating metal plate 215 and a trunk 210. The metal plate 215 may be made of any appropriate metal, while the trunk 210 may be made of metal, plastic, or any other appropriate material. Because the dial 200 is passive, it is resistant to noise and may not be sensitive to grip fingers. Although illustrated as having a single conductive element, the dial 200 may include any appropriate number of conductive elements.

Referring back to FIG. 1B, upon power-up of the touch screen display 100, touch screen controller 120 may measure the raw count value of each capacitive sensor 111(1)-111(N) in the capacitive sensor array 110. The raw count of a particular capacitive sensor 111 may refer to the measured sensor capacitance of that capacitive sensor. The touch screen controller 120 may then initialize a baseline capacitance of each capacitive sensor 111 to the raw count (measured sensor capacitance) of that capacitive sensor 111. The baseline capacitance of a capacitive sensor 111 may refer to the capacitance of the sensor without a user touch (e.g., without a conductive element nearby). The touch screen controller 120 assumes that there is no conductive element near any of the capacitive sensors 111 when it initializes the baseline capacitance of each capacitive sensor 111 to its raw count. The differential count for a particular capacitive sensor 111 may refer to the response of the capacitive sensor to a user touch/proximity of a conductive element, and may be defined as the raw count minus the baseline capacitance of the capacitive sensor. The touch screen controller 120 may perform a subsequent raw count value measurement of each capacitive sensor 111(1)-111(N).

Figure 3A:
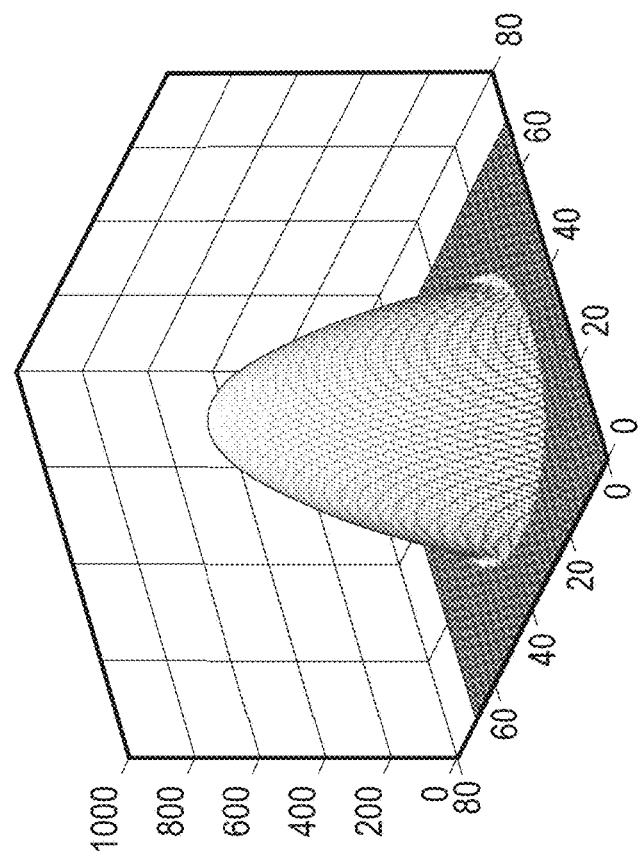
FIGS. 3A-3B illustrate a reference response paraboloid of a touch screen, according to some embodiments of the present disclosure.
Figure 3B:
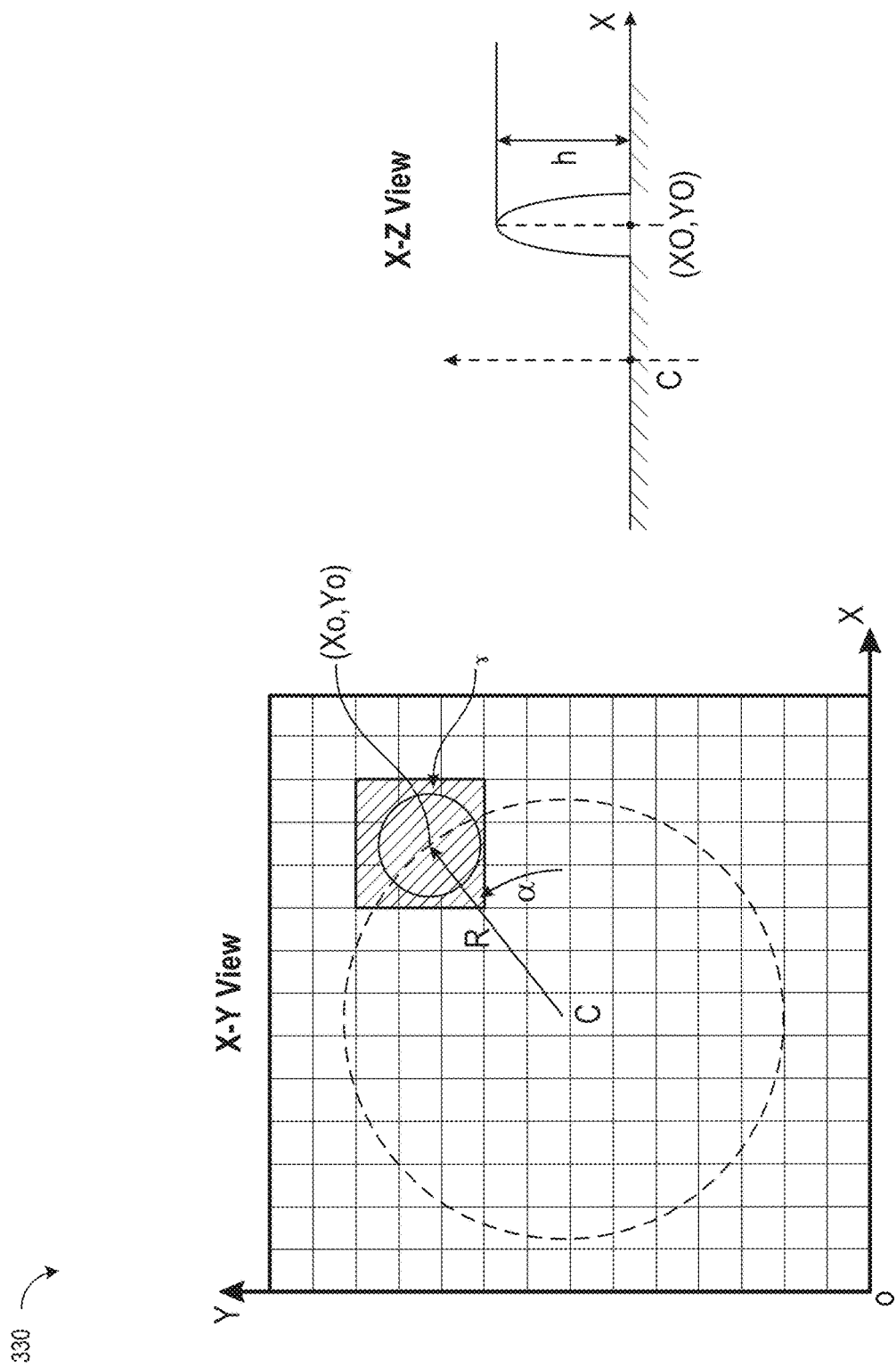

The touch screen controller 120 may execute correlation algorithm firmware to determine the correlation coefficient for each angle of the dial 200 as discussed in further detail herein. The correlation coefficient of a particular angle may refer to a level of similarity between the measured differential count value of a matrix of capacitive sensors 111 at that particular angle and the reference response value of the matrix of capacitive sensors 111 at that particular angle of the dial 200. Thus, the touch screen controller 120 may determine the correlation coefficient for a particular angle of the dial 200 based on the measured differential count value of a matrix of capacitive sensors 111 at that particular angle and the reference response value of the matrix of capacitive sensors 111 at that particular angle of the dial 200. Although discussed with respect to the correlation coefficient, any appropriate method of determining the similarity between the measured differential count value of a matrix of capacitive sensors 111 at a particular angle and the reference response value of the matrix of capacitive sensors 111 at that particular angle of the dial 200 may be used. For example, the touch screen controller 120 may use a least mean squares algorithm to determine the level of similarity between the measured differential count value of a matrix of capacitive sensors 111 at a particular angle and the reference response value of the matrix of capacitive sensors 111 at that particular angle of the dial 200. FIGS. 3A and 3B illustrate a reference response 300 for a particular angle of the dial 200. As shown in FIGS. 3A and 3B, the reference response 300 is modeled as a paraboloid having (X, Y, Z) coordinates. FIG. 3B illustrates x-y and x-z views of the reference response 300 (each block in the x-y view grid may represent a capacitive sensor 111), where O is the origin of the touch screen, C is the center of rotation of the dial, R is the dial radius, and a is the angle of rotation of the dial. The reference response 300 may refer to the ideal capacitive response of the matrix of capacitive sensors (indicated by the shaded sensors in FIG. 3B) at the particular angle. In the example of FIG. 3B, the matrix is a 3×3 matrix with its center located at the center of the reference paraboloid, indicated by the (X0, Y0) coordinates. The center of the reference paraboloid is in turn dependent on the radius of the dial 200 as shown in FIG. 3B. The reference response for each angle of the dial 200 may be pre-determined (e.g., at the time of manufacture of the touchscreen display 100) and stored in a memory 135 of the touch screen controller 120. The reference paraboloid 300 may have two primary tuning parameters, height (h) and radius (r). The r of the reference paraboloid 300 may be tuned to fit a sensor matrix (in the example of FIG. 3B, a 3×3 sensor matrix) of capacitive sensors whose capacitive response at that particular angle contributes to the measured capacitive response. The reference response is ideally the same for each angle, however there may be slight variations from angle to angle. It should be noted that compensation algorithms may be used to normalize the response of the sensing electrodes to each position/angle to compensate for reference responses that are significantly different from angle to angle.

Figure 4A:
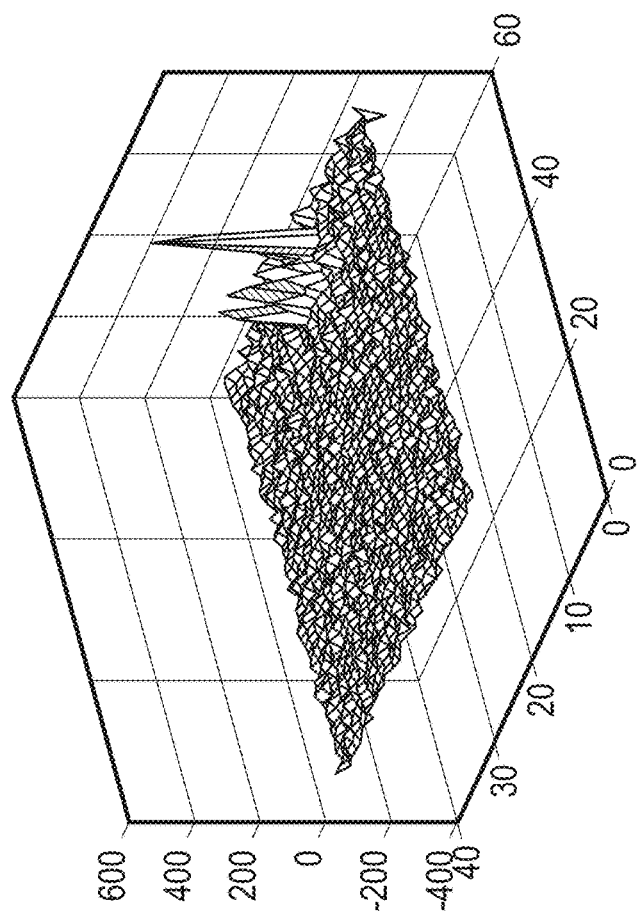
FIGS. 4A-4D illustrate real and reference responses of the touch screen at different angles, according to some embodiments of the present disclosure.
Figure 4B:
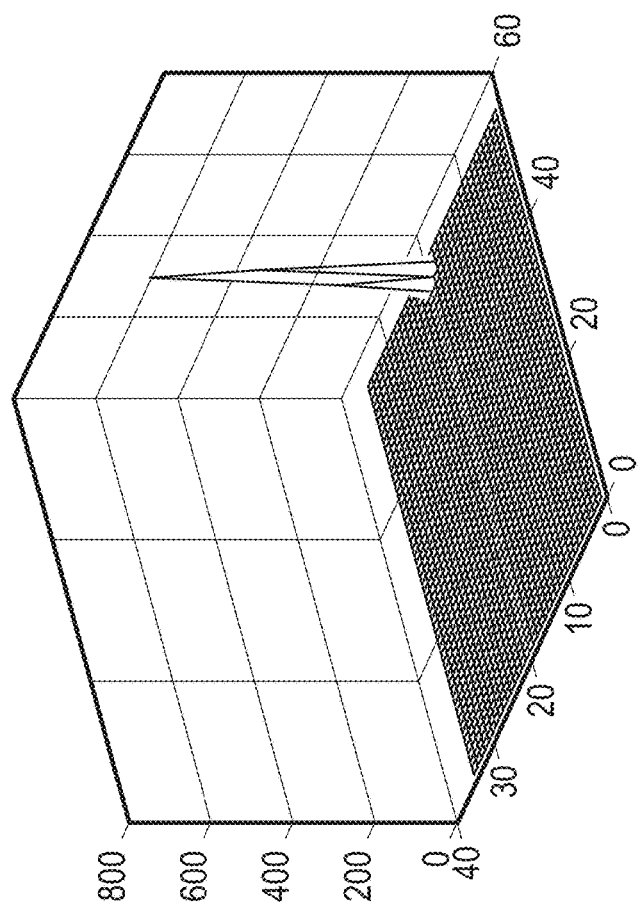
Figure 4C:
Figure 4C:
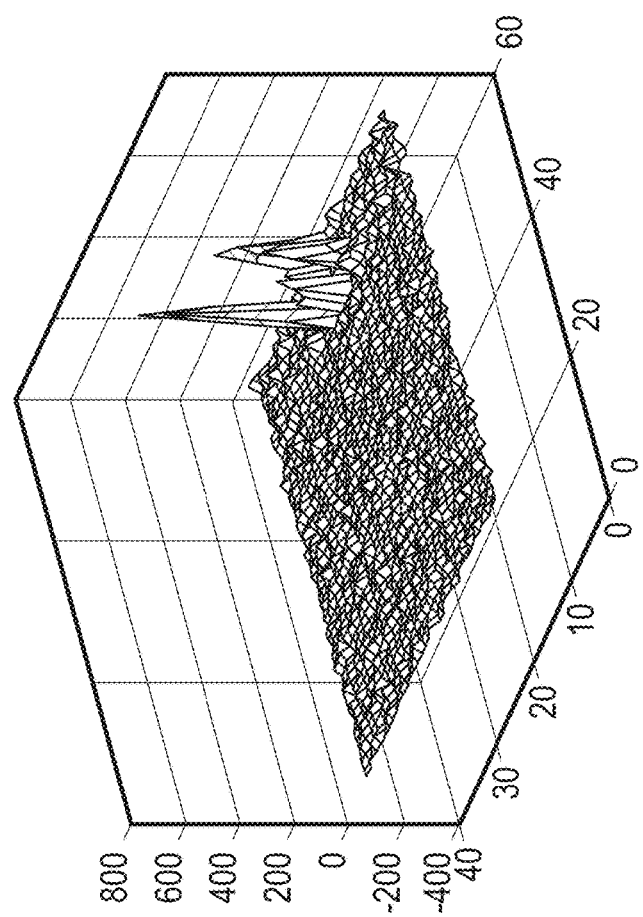
Figure 4D:
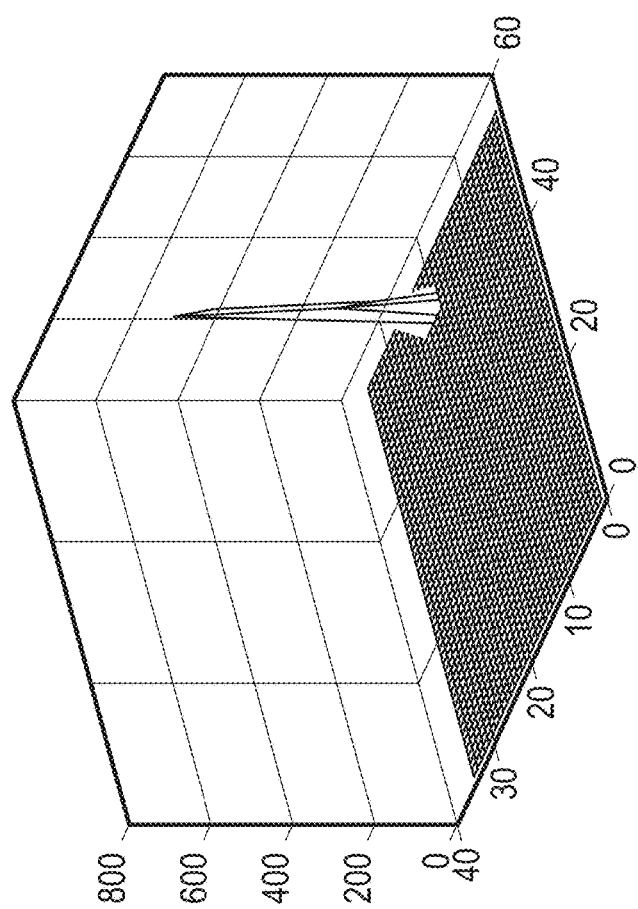
Figure 5A:
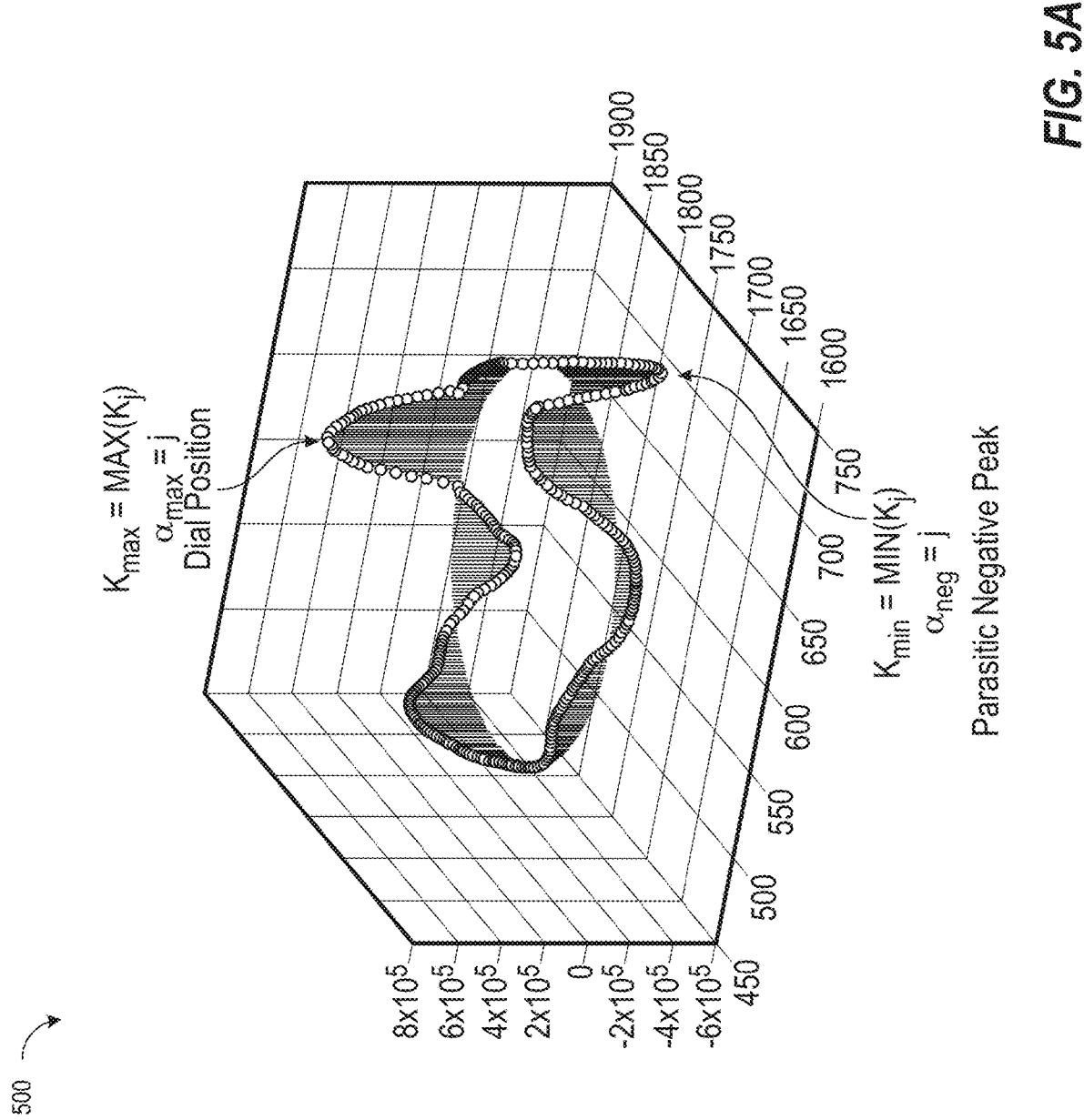
FIGS. 5A-5D illustrate correlation coefficients for each angle of a dial, according to some embodiments of the present disclosure.
Figure 5B:
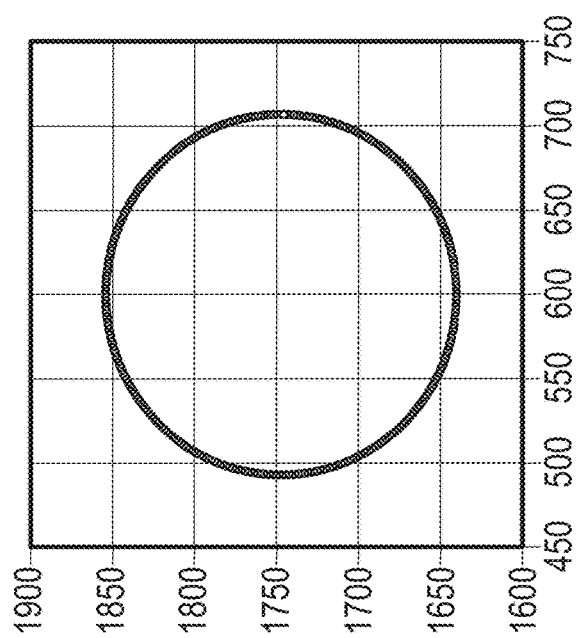
Figure 5C:
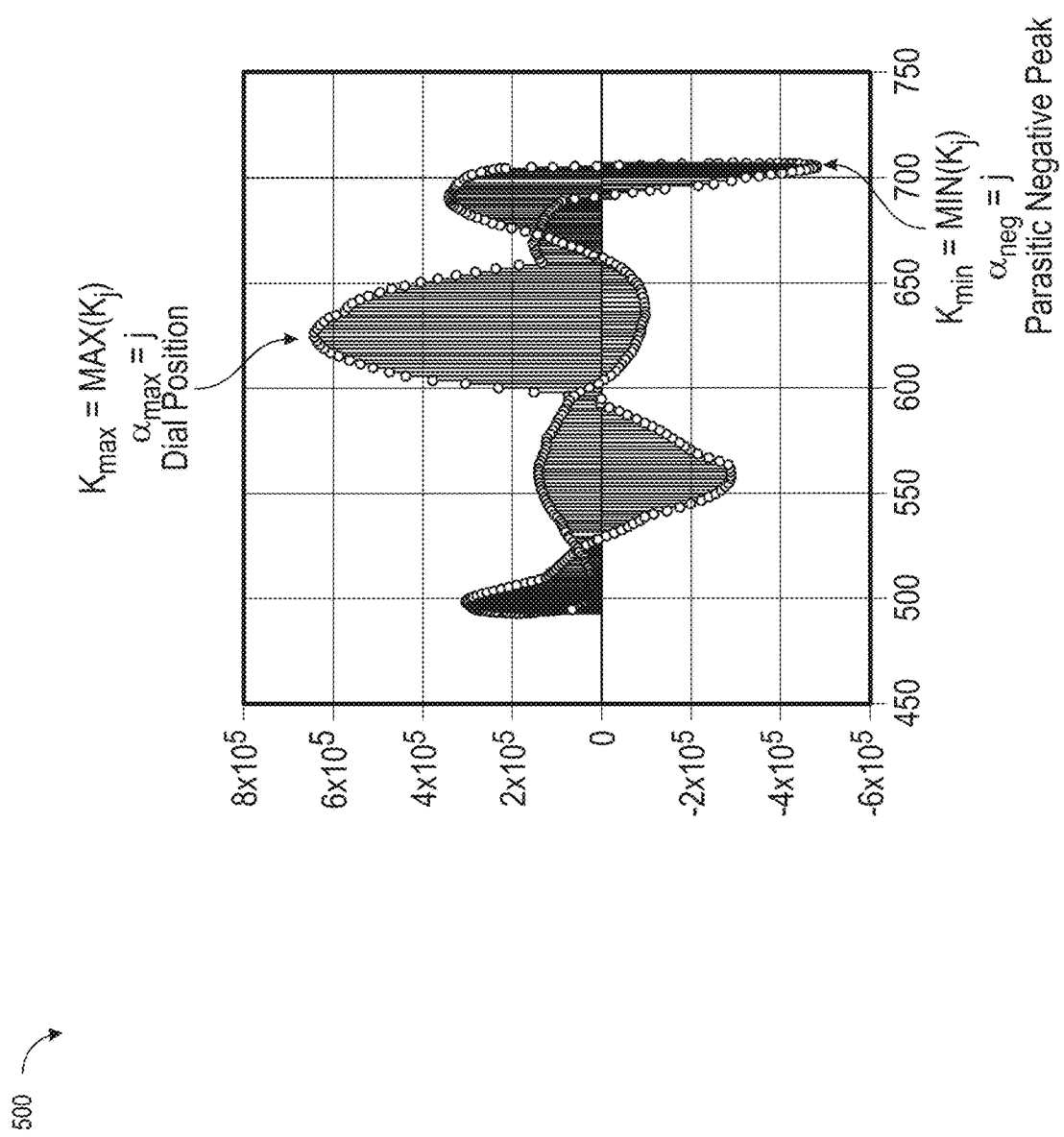
Figure 5D:
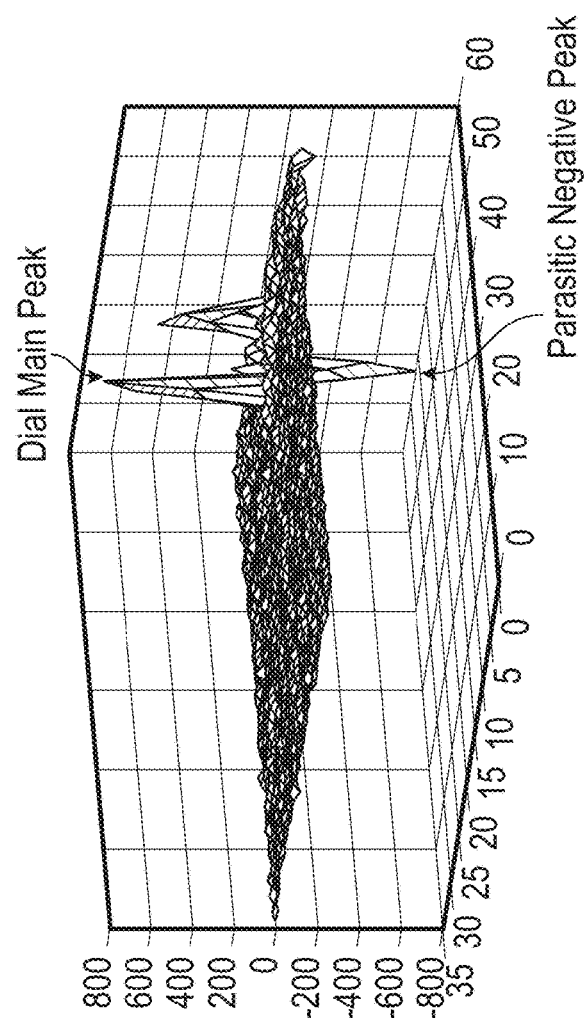

The touch screen controller 120 may then determine the measured differential count value for each possible angle of the dial 200. The measured differential count for a particular angle may refer to the measured differential count value of a matrix of capacitive sensors 111 at the particular angle. The matrix of sensors may be defined as discussed above with respect to the reference response 300. FIGS. 4A and 4C illustrate the measured differential count value for two different angles of dial 200, while FIGS. 4B and 4D illustrate the modeled reference response paraboloid for the same two angles of dial 200. The touch screen controller 120 may then determine the correlation coefficient ($K_j$) for each angle j (j=1 . . . 360) based on the measured differential count ($d_i$) for each angle j and the reference paraboloid coordinates ($X_i$, $Y_i$, $z_{ij}$) for each angle j, where i refers to the capacitive sensor matrix indexes (e.g., i=1 . . . 9 in a 3×3 capacitive sensor matrix) and j refers to the angle indexes (e.g., j=1 . . . 360). The touch screen controller 120 may identify the angle at which the correlation coefficient has its maximum value as the current angle of the dial 200. This may be represented by the equation:

$$\alpha_{max} = j, \text{ when} : K_{max} = \text{MAX}(K_j) \quad (1)$$

The touch screen controller 120 may determine the correlation coefficients using the following equations:

$$K_j = \sum_{i=1}^{9} z_{ij} d_i \quad (2)$$

$$z_{ij} = h - \left((x_i - x_{0j})^2 + (y_i - y_{0j})^2\right) / A \quad (3)$$

$$A = r^2 / h \quad (4)$$

$$x_{0j} = Xc + R\cos(\alpha_j) \quad (5)$$

$$y_{0j} = Yc + R\sin(\alpha_j) \quad (6)$$

All paraboloid z values below 0 are replaced by 0 values:

$$\text{If } z_{ij} < 0 \text{ then } z_{ij} = 0 \quad (7)$$

FIG. 5A-5D illustrate a graph of the correlation coefficient for each angle j (1 . . . 360). As shown, the angle at which the correlation coefficient reaches its maximum value corresponds to the position of dial 200. FIGS. 5A-5D also illustrate the angle at which the correlation coefficient is at its minimum ($K_{min}$=MIN($K_j$)). This may be shown by the equation:

$$\alpha_{neg} = j, \text{ when} : Kj = \text{MIN}(K_j) \quad (8)$$

In some embodiments, the touch screen controller 120 may utilize the angle at which the correlation coefficient is minimum to remove parasitic negative response, after the power on and initial movement. After the touch screen display 100 is powered on, the touch screen controller 120 may initialize the baseline capacitance for each capacitive sensor 111 to that sensor's raw-count (as discussed herein), including capacitive sensors that are currently under (or otherwise proximate to) the conductive element 205 (finger simulator) of the dial 200. The baseline capacitance of most of the capacitive sensors 111 may be zero since their raw count (measured capacitance) was zero. However, for those sensors under the conductive element at the time of initialization, their raw count is a positive (since they are reacting to the conductive element) non-zero value and their baseline capacitance is initialized to this non-zero positive value. As a result, the differential count for each capacitive sensor 111 is zero (differential count=raw count−baseline capacitance). However, after an initial rotation of dial 200, the differential count for the matrix of sensors around the new conductive element 205 position become positive, but the differential count for the matrix of sensors around the old position of conductive element 205 becomes negative permanently because the new raw count for the matrix of sensors around the old position is zero, but the baseline capacitance for these capacitive sensors was previously initialized to a positive value since the conductive element 205 was above them during initialization. As a result, the correlation coefficient of this position is permanently negative. Thus, the (negative) differential count of the matrix of sensors around the old position of conductive element 205 (represented by the angle at which the correlation coefficient is at its minimum) may form a parasitic negative peak, which may distort detection of the main peak that represents the maximum value of the correlation coefficient. Touch screen controller 120 may determine whether there has been an initial rotation of dial 200 as discussed in further detail herein (e.g., with respect to FIG. 7).

Therefore, in some embodiments, upon executing the correlation algorithm firmware and determining the correlation coefficients for each angle of dial 200, touch screen controller 120 may determine the peak negative correlation coefficient, and apply a baseline capacitance reset for each capacitive sensor 111 in the sensor matrix around the position corresponding to the peak negative correlation coefficient. Stated differently, touch screen controller 120 may re-initialize the baseline capacitance of each of the capacitive sensors 111 in the sensor matrix to their current raw count value (post-initial movement of dial 200). Upon re-initializing the baseline capacitance of each of these capacitive sensors 111, touch screen controller 120 may then execute the correlation algorithm firmware and determine the correlation coefficients for each angle of dial 200 once again. Touch screen controller 120 may then identify the angle at which the correlation coefficient is at its maximum as the angle of the dial 200. In this way, the determination of the correlation coefficient peak is not affected by the parasitic negative peak discussed above. The touch screen controller 120 may output data corresponding to the angle of the dial 200 to a user interface controller 140 which may display the angle on the touch screen 105 in any appropriate manner. In some embodiments, data corresponding to the current angle of the dial 200 may include the current angle of the dial 200 as well the change in angle from the previous position of the dial 200. In some embodiments, the touch screen controller 120 may output data corresponding to the current angle of the dial 200 incrementally, as the dial 200 moves for example.

Figure 6:
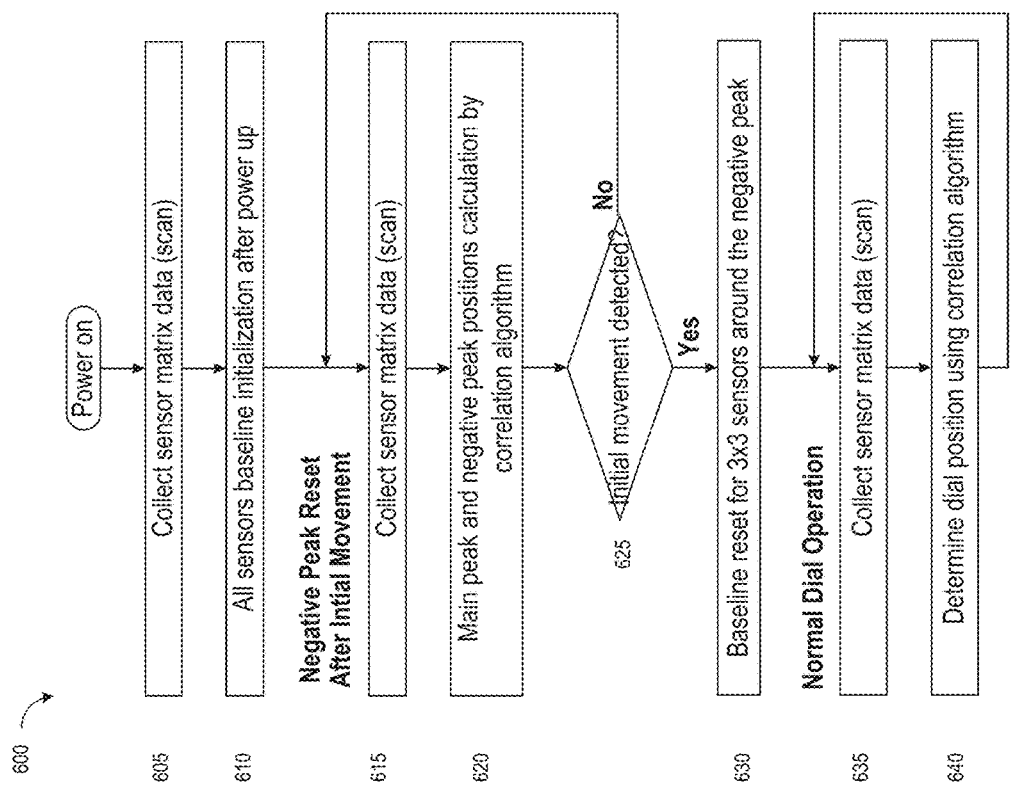
FIG. 6 illustrates a flow diagram of a method for detecting the angle of a dial, in accordance with some embodiments of the present disclosure.

FIG. 6 is a flow diagram of a method 600 of determining the position of a passive dial using capacitance sensing, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 600 may be performed by a touch screen controller 120 executing correlation algorithm firmware.

Referring also to FIG. 1B, at block 605, upon power-up of the touch screen display 100, touch screen controller 120 may measure the raw count value of each capacitive sensor 111(1)-111(N) in the capacitive sensor array 110. The raw count of a particular capacitive sensor 111 may refer to the measured sensor capacitance of that capacitive sensor. At block 610, the touch screen controller 120 may then initialize a baseline capacitance of each capacitive sensor 111 to the raw count (measured sensor capacitance) of that capacitive sensor 111. The baseline capacitance of a capacitive sensor 111 may refer to the capacitance of the sensor without a user touch (e.g., without a conductive element nearby).

The touch screen controller 120 assumes that there is no conductive element near any of the capacitive sensors 111 when it initializes the baseline capacitance of each capacitive sensor 111 to its raw count. The differential count for a particular capacitive sensor 111 may refer to the response of the capacitive sensor to a user touch/proximity of a conductive element, and may be defined as the raw count minus the baseline capacitance of the capacitive sensor. The touch screen controller 120 may perform a subsequent raw count value measurement of each capacitive sensor 111(1)-111(N).

At block 615, the touch screen controller 120 may then perform a subsequent raw count value measurement of each capacitive sensor 111(1)-111(N). At block 620, the touch screen controller 120 may then execute correlation algorithm firmware to determine the correlation coefficient for each angle position of the dial 200 as discussed in further detail herein. At block 620, the touch screen controller 120 may determine if an initial movement of the dial 200 has been detected, as further described with respect to FIG. 7.

At block 625, if an initial movement of the dial 200 has been detected, then at block 630 the touch screen controller 120 may utilize the angle at which the correlation coefficient is minimum to remove parasitic negative response by performing a baseline reset for a matrix of sensors surrounding the angle at which the correlation coefficient is minimum. As discussed herein, after the touch screen display 100 is powered on, baseline capacitance for each capacitive sensor 111 are initialized to that sensor's raw-count, including capacitive sensors under the conductive element 205 (finger simulator) of the dial 200. Therefore, the differential count for each capacitive sensor 111 is zero (differential count=raw count−baseline capacitance). However, after an initial rotation of dial 200, the differential count for the matrix of sensors around the new conductive element 205 position become positive, but the differential count for the matrix of sensors around the old position of conductive element 205 becomes negative permanently because the new raw count for the matrix of sensors around the old position is zero, but the baseline capacitance for these capacitive sensors was previously initialized to a positive value since the conductive element 205 was above them during initialization. As a result, the correlation coefficient of this position is permanently negative. Thus, the (negative) differential count of the matrix of sensors around the old position of conductive element 205 (represented by the angle at which the correlation coefficient is at its minimum) may form a parasitic negative peak, which may distort detection of the main peak that represents the maximum value of the correlation coefficient. Touch screen controller 120 may determine whether there has been an initial rotation of dial 200 as discussed in further detail herein (e.g., with respect to FIG. 7).

Therefore, in some embodiments, upon executing the correlation algorithm firmware and determining the correlation coefficients for each angle of dial 200, touch screen controller 120 may determine the peak negative correlation coefficient, and apply a baseline capacitance reset for each capacitive sensor 111 in the sensor matrix around the position corresponding to the peak negative correlation coefficient. Stated differently, touch screen controller 120 may re-initialize the baseline capacitance of each of the capacitive sensors in the sensor matrix to their current raw count value (post-initial movement of dial 200). Upon re-initializing the baseline capacitance of each of these capacitive sensors 110, touch screen controller 120 may then execute the correlation algorithm firmware and determine the correlation coefficients for each angle of dial 200 once again. Touch screen controller 120 may then identify the angle/position at which the correlation coefficient is at its maximum as the angle/position of the dial 200. In this way, the determination of the correlation coefficient peak is not affected by the parasitic negative peak discussed above.

At block 635, the touch screen controller 120 may then perform another raw count value measurement of each capacitive sensor 111(1)-111(N) and at block 640 may determine the dial position using the correlation algorithm, as discussed herein (e.g., with respect to FIGS. 3 and 4).

Figure 7:
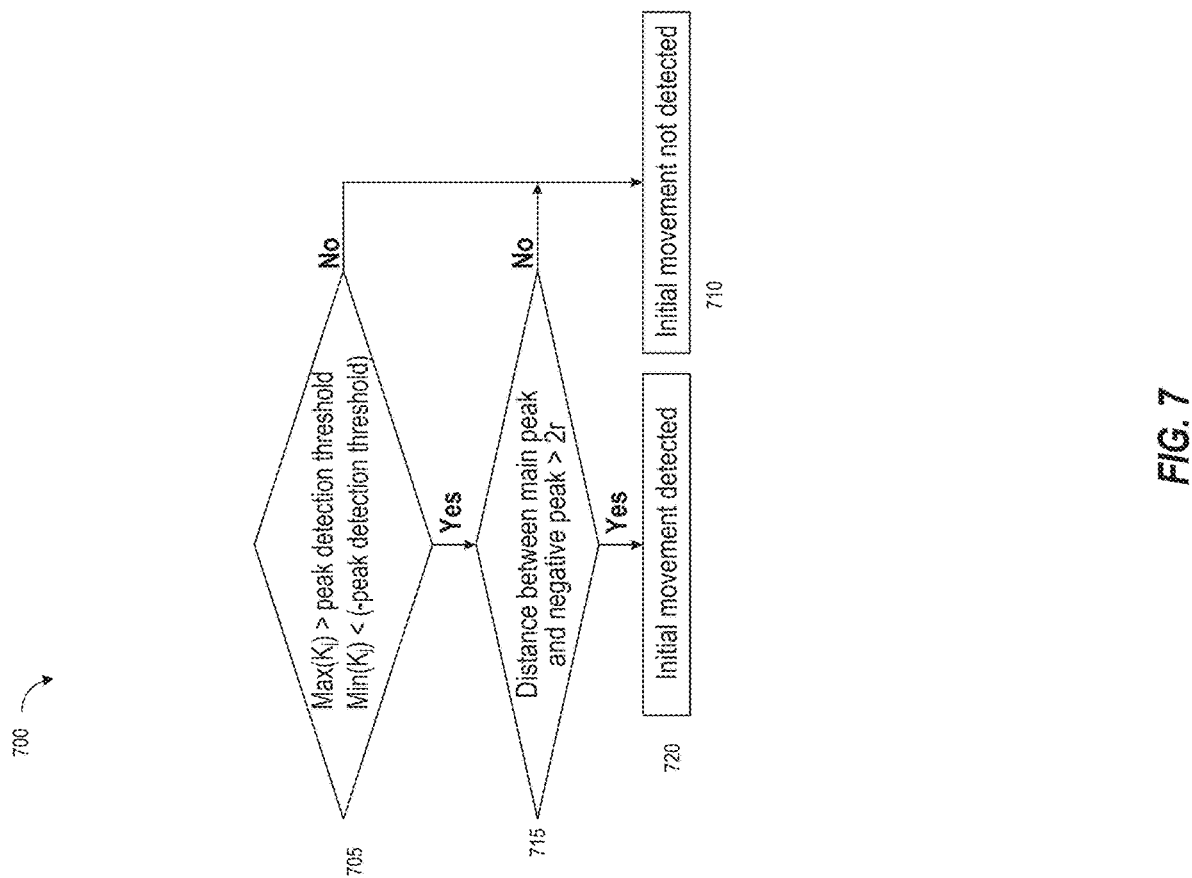
FIG. 7 illustrates a flow diagram of a method for detecting an initial movement of a dial, in accordance with some embodiments of the present disclosure.

FIG. 7 is a flow diagram of a method 700 for detecting an initial movement of a passive dial, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 700 may be performed by a touch screen controller 120 executing correlation algorithm firmware.

At block 705, the touch screen controller 120 may determine if the maximum correlation coefficient (Max $K_j$) is greater than the peak detection threshold, and if the minimum correlation coefficient (Min $K_j$) is less than the negative peak detection threshold. If not, then the touch screen controller 120 may determine that there has been no initial movement of the passive dial (block 710). If the touch screen controller 120 determines that the condition at block 705 has been met, then at block 715, it may determine whether the distance between the main peak and the negative mean peak is greater than twice the radius of the reference paraboloid. If not, then the touch screen controller 120 may determine that there has been no initial movement of the passive dial (block 710). If the touch screen controller 120 determines that the condition at block 715 has been met, then it may determine that there has been an initial movement of the passive dial (block 720).

Figure 8:
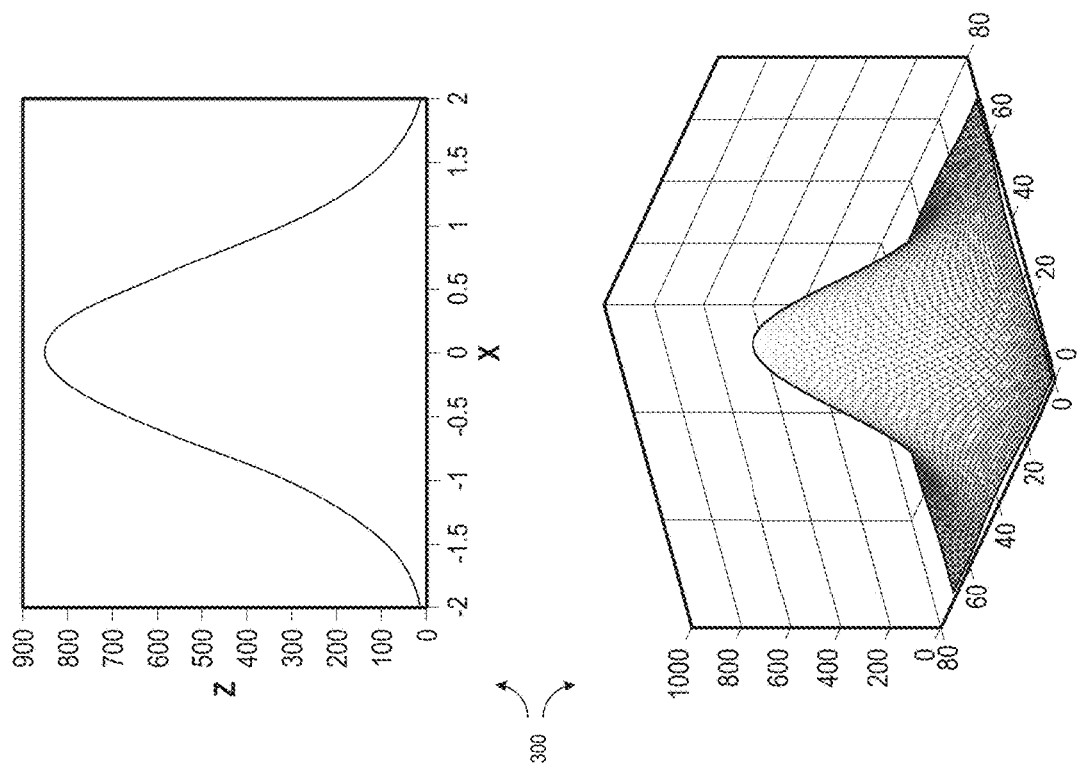
FIG. 8 illustrates a reference response modeled as a Gaussian, in accordance with some embodiments of the present disclosure.

In some embodiments, the reference response 300 of FIG. 3 may be modeled as a Gaussian, instead of as a paraboloid. A Gaussian reference model may have better similarity to a real conductive element response but may also involve more complicated and processor intensive mathematical calculations. FIG. 8 illustrates the reference response 300 modeled as a Gaussian in a 3 dimensional (X, Y, Z) coordinate system. Touch screen controller 120 may calculate correlation coefficients in the same manner as described above with respect to reference responses modeled as a paraboloid (as discussed with respect to FIG. 3), however the height ($Z_i$) of the Gaussian model may be calculated as:

$$z_i = he^{-\frac{(x_i-x_0)^2+(y_i-y_0)^2}{2c^2}} \tag{9}$$

In the above equation, c may refer to the radius coefficient of the Gaussian.

Figure 9:
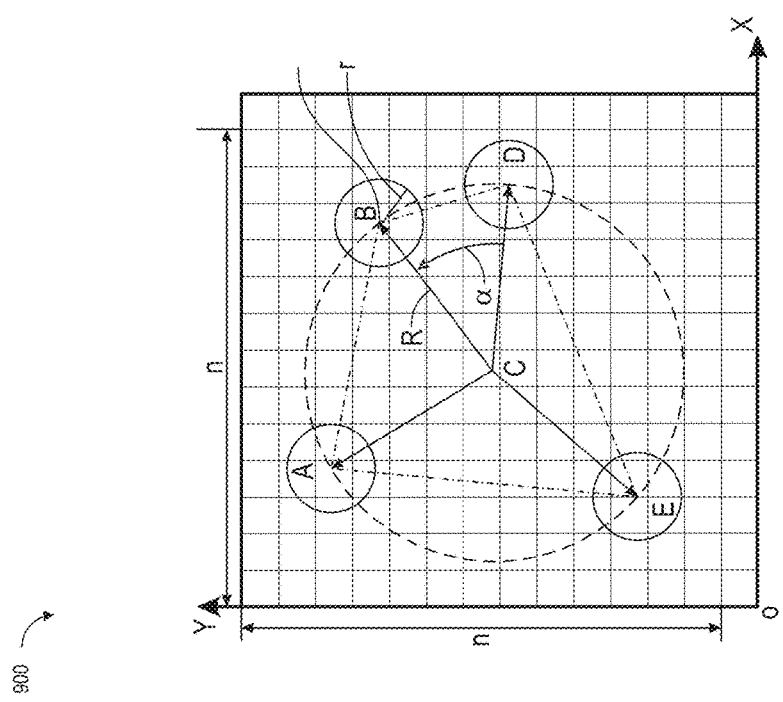
FIG. 9 illustrates a dial with multiple conductive elements, in accordance with some embodiments of the present disclosure.

In some embodiments, the dial 200 may include more than one conductive element. For example, the dial 200 may include three or more conductive elements allocated irregularly over the dial 200 with pseudorandom distance from each other. FIG. 9 illustrates an x-y view of a sensor grid 900 when dial 200 includes conductive elements A, B, D, and E having pseudorandom distance from each other (AB≠BD≠DE≠EA). As shown in FIG. 9, the reference pattern (sensor matrix surrounding the conductive element) is extended from a 3×3 square matrix to an n×n square matrix and is a combination of single conductive element reference models allocated according to real conductive elements, at the exactly same position, around the dial center C. Touch screen controller 120 may perform the correlation coefficient calculation in the same way as for embodiments involving a single conductive element, but the equation (2) sum is extended from 3×3 to n×n, to reflect the larger reference response model size:

$$K_j = \sum_{i=1}^{n \times n} z_{ij} d_i \quad (10)$$

After that, the same equations (1) and (8), as for embodiments involving single conductive elements should be used to define the dial angle position and negative peak after initial movement position. Because a larger amount of sensor data is used for the correlation coefficients calculation, use of multiple conductive elements has much better noise immunity than single conductive element embodiments. However, the amount of mathematical calculations required also increases by M times:

$$M = \frac{n^2}{3^2} \quad (11)$$

In some embodiments, touch screen controller 120 may utilize the least square method to determine a measure of similarity between the differential count response to conductive elements and reference response model at each angle, instead of calculating correlation coefficients for the two parameters at each angle. In these embodiments, $\alpha_{min}$ is the resolved conductive finger simulator angle, as shown by the equations below:

$$\alpha_{min} = j, \text{ when}: L_{min} = \text{MIN}(L_j) \quad (12)$$

$$L_j = \sum_{i=1}^{9} (z_{ij} - d_i)^2 \quad (13)$$

In the above equations, Lj is the least square distance for angles j.

Figure 10:
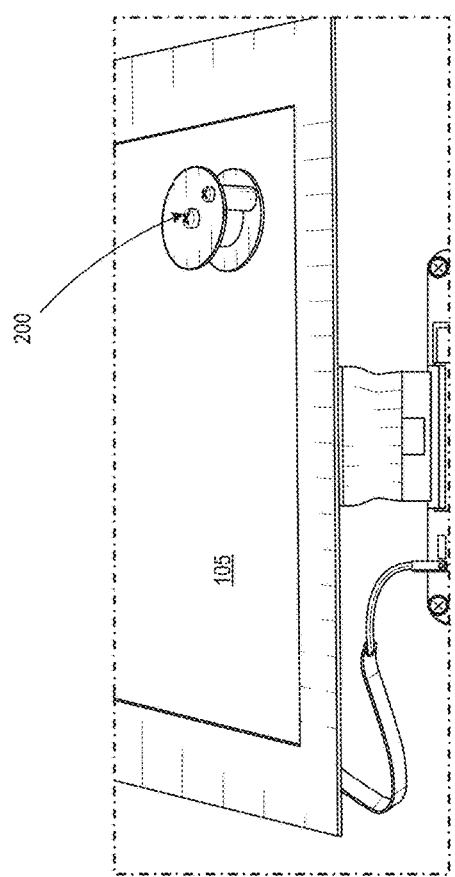
FIG. 10 illustrates a touch screen display, in accordance with some embodiments of the present disclosure.

FIG. 10 is an illustrative representation of a touch screen display (such as touch screen display 100 of FIG. 1) with a passive dial 200 mounted on it.

Figure 11:
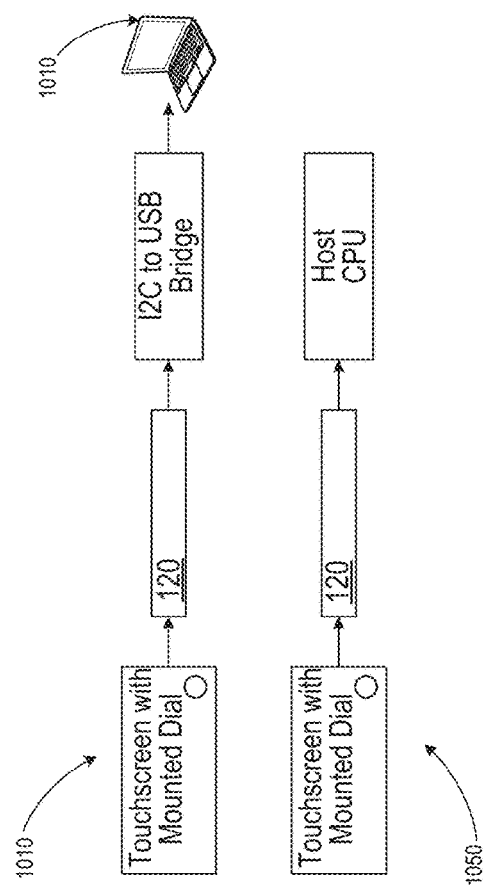
FIG. 11 illustrates systems for tuning and operation of a touch screen display, in accordance with some embodiments of the present disclosure.

FIG. 11 illustrates a system 1000 for tuning and a system 1050 for operation of a touch screen display, in accordance with some embodiments of the present disclosure. In system 1000, during manufacture, for example, the capacitive response of the touch screen is measured at each dial angle using specialized measurement software (e.g., on computing device 1010). The computing device 1010 may tune the reference paraboloid height and radius to the measured main peak height and radius values and store these parameters in a memory of the touch screen controller 120.

System 1050 illustrates an operational environment similar to the one described in FIG. 1B, in an embodiment where the determination of the angle of the passive dial is performed by a host CPU of a separate device.

Figure 12:
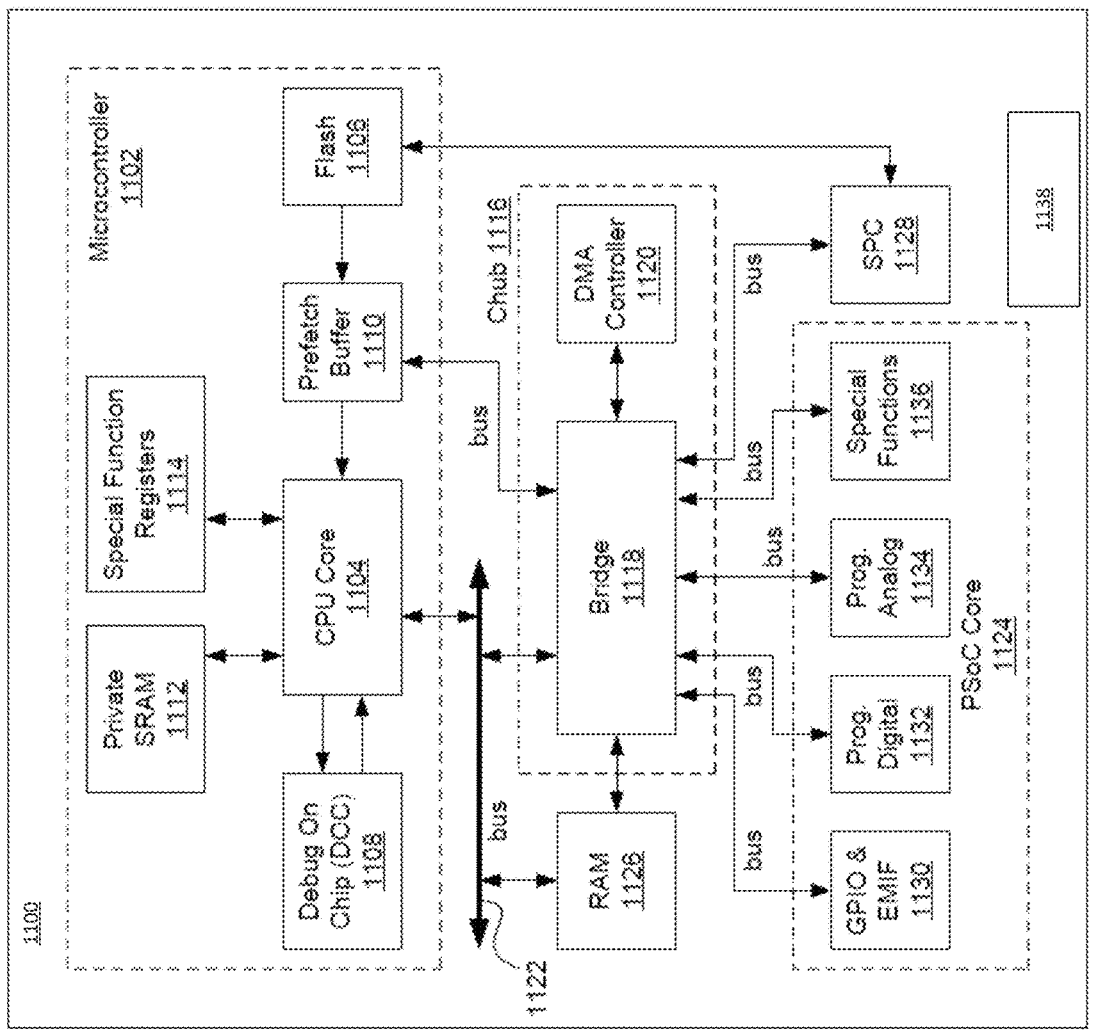
FIG. 12 illustrates an embodiment of a core architecture of the Programmable System-on-Chip (PSoC®) processing device.

FIG. 12 illustrates an embodiment of a core architecture 1100 of the PSoC® processing device, such as that used in the PSoC3® family of products offered by Cypress Semiconductor Corporation (San Jose, Calif.). In one embodiment, the core architecture 1100 includes a microcontroller 1102. The microcontroller 1102 includes a CPU (central processing unit) core 1104 (which may correspond to processing device 130 of FIG. 1), flash program storage 1106, DOC (debug on chip) 1108, a prefetch buffer 1110, a private SRAM (static random access memory) 1112, and special functions registers 1114. In an embodiment, the DOC 1108, prefetch buffer 1110, private SRAM 1112, and special function registers 1114 are coupled to the CPU core 1104 (e.g., CPU core 1006), while the flash program storage 1106 is coupled to the prefetch buffer 1110.

The core architecture 1100 may also include a CHub (core hub) 1116, including a bridge 1118 and a DMA controller 1120 that is coupled to the microcontroller 1102 via bus 1122. The CHub 1116 may provide the primary data and control interface between the microcontroller 1102 and its peripherals (e.g., peripherals) and memory, and a programmable core 1124. The DMA controller 1120 may be programmed to transfer data between system elements without burdening the CPU core 1104. In various embodiments, each of these subcomponents of the microcontroller 1102 and CHub 1116 may be different with each choice or type of CPU core 1104. The CHub 1116 may also be coupled to shared SRAM 1126 and an SPC (system performance controller) 1128. The private SRAM 1112 is independent of the shared SRAM 1126 that is accessed by the microcontroller 1102 through the bridge 1118. The CPU core 1104 accesses the private SRAM 1112 without going through the bridge 1118, thus allowing local register and RAM accesses to occur simultaneously with DMA access to shared SRAM 1126. Although labeled here as SRAM, these memory modules may be any suitable type of a wide variety of (volatile or non-volatile) memory or data storage modules in various other embodiments. The core architecture 1100 may also include an analog front end 1138 that performs the measurement and digitizing of capacitance values (similar to the capacitance sensing circuit 125 illustrated in FIGS. 1A and 1B).

In various embodiments, the programmable core 1124 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 1124 includes a GPIO (general purpose IO) and EMIF (extended memory interface) block 1130 to provide a mechanism to extend the external off-chip access of the microcontroller 1102, a programmable digital block 1132, a programmable analog block 1134, and a special functions block 1136, each configured to implement one or more of the subcomponent functions. In various embodiments, the special functions block 1136 may include dedicated (non-programmable) functional blocks and/or include one or more interfaces to dedicated functional blocks, such as USB, a crystal oscillator drive, JTAG, and the like.

The programmable digital block 1132 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 1132 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 1104) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 1134 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 1134 may support various analog functions including, but not limited to, analog routing, LCD drive TO support, capacitance-sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

The embodiments described herein may be used in various designs of mutual-capacitance sensing systems, in self-capacitance sensing systems, or combinations of both. In one embodiment, the capacitance sensing system detects multiple sense elements that are activated in the array and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "detecting," "comparing," "resetting," "adding," "calculating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:

1. A touchscreen comprising:
   a plurality of capacitive sense elements disposed in an array; and
   a touchscreen controller operatively coupled to the plurality of capacitive sense elements, the touchscreen controller to:
      determine a correlation coefficient based on a reference response of a set of the plurality of capacitive sense elements and a measured response of the set of capacitive sense elements to one or more conductive elements of a passive dial disposed on the array, wherein:
         the correlation coefficient is determined for each angle of the passive dial, and
         the correlation coefficient is indicative of a level of similarity between the reference response and the measured response, each for a particular angle;
      detect, based on the correlation coefficient for each angle of the passive dial, a current angle of the passive dial by identifying an angle of the passive dial having a maximum correlation coefficient;
      output data corresponding to the current angle of the passive dial to a user interface controller.

2. The touchscreen of claim 1, wherein a set of capacitive sense elements for a particular angle of the passive dial form a matrix having a center located on an edge of the passive dial at the particular angle.

3. The touchscreen of claim 2, wherein the reference response of the set of capacitive sense elements is modeled as a paraboloid.

4. The touchscreen of claim 2, wherein the reference response of the set of capacitive sense elements is modeled as a Gaussian.

5. The touchscreen of claim 1, wherein the touchscreen controller is further configured to:
   measure a raw count value for each of the plurality of capacitive sense elements; and
   initialize a baseline response value for each of the plurality of capacitive sense elements to their measured raw count value.

6. The touchscreen of claim 5, wherein the touchscreen controller is further configured to:
   identify an angle of the passive dial having a minimum correlation coefficient, the minimum correlation coefficient corresponding to a parasitic negative peak; and
   in response to detecting an initial movement of the passive dial, reset, for each of a second set of the plurality of capacitive sensors, a baseline response value of the capacitive sense element to its current respective raw count value, wherein the second set of capacitive sense elements form a matrix having a center located on an edge of the passive dial at the angle corresponding to the minimum correlation coefficient.

7. A method comprising:
   measuring, by a capacitance measurement circuit of a touch screen controller, a capacitance on a plurality of capacitive sense elements arranged in an array;
   determining, by the touch screen controller a correlation coefficient for each angle of a passive dial disposed on the array, the passive dial comprising at least one conductive element, wherein:
      the correlation coefficient is derived from a reference response of a set of the plurality of capacitive sense elements and a measured capacitive response of the set of capacitive sense elements to the one or more conductive elements of the passive dial, and
      the correlation coefficient for each angle of the passive dial is indicative of a level of similarity between the reference response for a particular angle and the measured response for the particular angle;
   detecting, by the touch screen controller a current angle of the passive dial by identifying an angle of the passive dial having a maximum correlation coefficient; and
   outputting data, by the touch screen controller, the data corresponding to the current angle of the passive dial to a user interface controller.

8. The method of claim 7, wherein a set of capacitive sense elements for a particular angle of the passive dial form a matrix having a center located on an edge of the passive dial at the particular angle.

9. The method of claim 8, wherein the reference response of the set of capacitive sense elements is modeled as a paraboloid.

10. The method of claim 8, wherein the reference response of the set of capacitive sense elements is modeled as a Gaussian.

11. The method of claim 7, further comprising:
measuring a raw count value for each of the plurality of capacitive sense elements; and
initializing a baseline response value for each of the plurality of capacitive sense elements to their measured raw count value.

12. The method of claim 11, further comprising:
identifying an angle of the passive dial having a minimum measure of similarity between a reference response of a set of the plurality of capacitive sense elements and a measured capacitive response of the set of capacitive sense elements, the minimum measure of similarity corresponding to a parasitic negative peak; and
in response to detecting an initial movement of the passive dial, resetting, for each of a second set of the plurality of capacitive sense elements, a baseline response value of the capacitive sense element to its current respective raw count value, wherein the second set of capacitive sense elements form a matrix having a center located on an edge of the passive dial at the angle corresponding to the minimum measure of similarity.

* * * * *